(12) United States Patent
Gicquel et al.

(10) Patent No.: US 10,120,099 B2
(45) Date of Patent: Nov. 6, 2018

(54) RUGGED SEMICONDUCTOR RADIATION DETECTOR

(71) Applicant: Schlumberger Technology Corporation, Sugar Land, TX (US)

(72) Inventors: Frederic Gicquel, Katy, TX (US); Olivier G. Philip, Ewing, NJ (US); Christian Stoller, Sugar Land, TX (US); Zilu Zhou, Needham, MA (US)

(73) Assignee: SCHLUMBERGER TECHNOLOGY CORPORATON, Sugar Land, TX (US)

( * ) Notice: Subject to any disclaimer, the term of this patent is extended or adjusted under 35 U.S.C. 154(b) by 0 days.

(21) Appl. No.: 15/326,920

(22) PCT Filed: Jul. 21, 2015

(86) PCT No.: PCT/US2015/041359
§ 371 (c)(1),
(2) Date: Jan. 17, 2017

(87) PCT Pub. No.: WO2016/018676
PCT Pub. Date: Feb. 4, 2016

(65) Prior Publication Data
US 2017/0205529 A1    Jul. 20, 2017

Related U.S. Application Data

(60) Provisional application No. 62/031,385, filed on Jul. 31, 2014.

(51) Int. Cl.
| | |
|---|---|
| *G01V 5/00* | (2006.01) |
| *G01V 5/10* | (2006.01) |
| *G01T 1/24* | (2006.01) |

(52) U.S. Cl.
CPC ............. *G01V 5/107* (2013.01); *G01T 1/241* (2013.01)

(58) Field of Classification Search
CPC ......... G01V 5/107; G01T 1/241; H01L 51/41; H01L 21/84; H01L 27/1203; H01L 27/1108; G01N 33/2823
(Continued)

(56) References Cited

U.S. PATENT DOCUMENTS

| | | |
|---|---|---|
| 3,805,078 A | 4/1974 | Koxlov |
| 8,642,944 B2 | 2/2014 | Saenger et al. |
| 2008/0258066 A1 | 10/2008 | Chen et al. |
| 2009/0140134 A1 | 6/2009 | Stoller et al. |

(Continued)

FOREIGN PATENT DOCUMENTS

| | | |
|---|---|---|
| EP | 0479625 B1 | 4/1992 |
| WO | 97/00456 | 1/1997 |

OTHER PUBLICATIONS

R. J. Tapper, "Diamond detectors in particle physics," Rep. Prog. Phys., vol. 63, p. 1273-1316, 2000.
(Continued)

*Primary Examiner* — David Porta
*Assistant Examiner* — Meenakshi Sahu
(74) *Attorney, Agent, or Firm* — Michael Dae (57) ABSTRACT

Devices and methods for a rugged semiconductor radiation detector are provided. The semiconductor detector may include a hermetically sealed housing and a semiconductor disposed within the housing that has a first surface and a second surface opposite one another. A first metallization layer may at least partially cover the first surface of the semiconductor and a second metallization layer may at least partially cover the second surface of the semiconductor. The first metallization layer or the second metallization layer, or both, do not extend completely to an edge of the semiconductor, thereby providing a nonconductive buffer zone. This reduces electrical field stresses that occur when a voltage potential is applied between the first metallization layer and
(Continued)

the second metallization layer and reduces a likelihood of electrical failure (e.g., due to arcing).

20 Claims, 5 Drawing Sheets

(58) Field of Classification Search
USPC .......... 250/254, 253, 308, 366, 368; 438/99; 175/40
See application file for complete search history.

(56) References Cited

U.S. PATENT DOCUMENTS

| | | |
|---|---|---|
| 2009/0266990 A1 | 10/2009 | Menge et al. |
| 2012/0267520 A1 | 10/2012 | Roscoe |
| 2013/0264669 A1 | 10/2013 | Li et al. |

OTHER PUBLICATIONS

W. Adam et al., "Radiation hard diamond sensors for future tracking applications," Nucl. Instrum. Methods Phys. Res. A, vol. A565, p. 278-283, 2006.

M. Angelone, M. Pillon, M. Marinelli, E. Milani, A. Paoletti, G. Pucella, A. Tucciarone, G. Verona-Rinati, L. Bertalot, F. Orsitto, S. Popovichev, and A. Murari, "Time dependent 14 MeV neutrons measurement using a polycrystalline chemical vapor deposited diamond detector at JET tokamak," Rev. Sci. Instrum., vol. 76, p. 013506, 2005. (7 pages).

M. Pillon, M. Angelone, and A. Krasilnikov, "14 MeV neutron spectra measurements with 4% energy resolution using type IIa diamond detector," Nucl. Instrum. Methods Phys. Res. B, vol. B101, p. 473-483, 1995.

International Search Report and Written Opinion issued in the related PCT Application PCT/US2015/041359, dated Oct. 30, 2015 (11 pages).

RUGGED SEMICONDUCTOR RADIATION DETECTOR

CROSS-REFERENCE TO RELATED APPLICATIONS

This application claims priority to U.S. Provisional Patent Application Ser. No. 62/031385, which was filed on Jul. 31, 2014, and is incorporated herein by reference in its entirety.

BACKGROUND

This disclosure relates to a rugged semiconductor radiation detector that can survive a high-temperature and/or high-vibration environment. The rugged semiconductor radiation detector may be used, for example, in well-logging in high-temperature, high-pressure borehole environments.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Identifying the composition of a geological formation can provide information about the likely presence or absence of hydrocarbons. As such, many downhole tools have been developed that attempt to analyze the geological formation from within a wellbore. These tools include, among other things, tools that emit ionizing or nuclear radiation into the formation and detect radiation that results using a radiation detector. The radiation that results may indicate the composition or other properties of the formation.

Some downhole tools, for example, may use a neutron generator to emit neutrons into the surrounding formation. The neutrons may interact with the elements that make up the formation in various ways depending on the composition of the formation. Different formation compositions may cause the neutrons to scatter in different ways. Thus, by detecting the manner in which the neutrons scatter in the formation and return to the tool, properties of the formation (e.g., density) may be estimated. The downhole tool may detect the neutrons using one or more neutron detectors at various spacings from the neutron generator. Moreover, many downhole tools may use a neutron monitor to accurately gauge the output of the neutron generator. Downhole tools may also measure other types of radiation using other radiation detectors, such as gamma-ray detectors, x-ray detectors, and so forth. The radiation detectors may use a scintillator (e.g., a plastic scintillator) that emits light when radiation interacts with the scintillator, and a photomultiplier to amplify the light signal.

Each of these radiation detectors takes up space in the downhole tool. This limits the number of radiation detectors that may be included in a downhole tool of a particular size. To include additional radiation detectors, the size of the downhole tool may be increased. However, increasing the size of the downhole tool may cause the downhole tool to become unsuitably large for certain applications. Some radiation detectors may take up less space (e.g., semiconductor detectors) by avoiding the use of photomultipliers, but these may be prone to degradation under harsh downhole conditions. Under these conditions, for example, the semiconductor detectors may suffer electrical failure due to arcing under high temperatures.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to a rugged semiconductor radiation detector. The semiconductor detector may include a hermetically sealed housing and a semiconductor disposed within the housing that has a first surface and a second surface opposite one another. A first metallization layer may at least partially cover the first surface of the semiconductor and a second metallization layer may at least partially cover the second surface of the semiconductor. The first metallization layer or the second metallization layer, or both, do not extend completely to an edge of the semiconductor, thereby providing a nonconductive buffer zone. This reduces electrical field stresses that occur when a voltage potential is applied between the first metallization layer and the second metallization layer and reduces a likelihood of electrical failure (e.g., due to arcing).

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One way to identify characteristics of a geological formation is through radiation-based downhole tools. This disclosure describes a rugged semiconductor radiation detector that can be both relatively small and compact, as well as survive the harsh environment of a downhole well. The rugged semiconductor radiation detector of this disclosure may be used in a radiation-based downhole tool, but also may be used in other contexts. For example, the rugged semiconductor radiation detector may be used in the context of nuclear power generation (fission but especially fusion), because the rugged semiconductor radiation detector of this disclosure may be sensitive to neutrons with a wide range of energies depending on the construction and can be used to monitor neutron flux in difficult (high-temperature, high-neutron flux, high-vibration) environments. The rugged semiconductor radiation detector may even survive high-temperature/high-pressure wells, some of which may reach temperatures in excess of 350 degrees Fahrenheit. As mentioned above, fusion reactors would provide a wide field of applications for the rugged semiconductor radiation detector of this disclosure. Moreover, the rugged semiconductor radiation detector may also be suitable for use in high-energy physics as in a central detector at a particle accelerator (e.g., in one or more of the Large Hadron Collider experiments at the European Organization for Nuclear Research (CERN)). Similarly, the rugged semiconductor radiation detector of this disclosure may also be used in applications for homeland security that involve the use of a pulsed neutron source with source monitor (e.g., for the detection of explosives).

The rugged semiconductor radiation detector of this disclosure may also be used for monitoring an x-ray flux produced by an electron accelerator (e.g., DC x-ray, linear particle accelerator (LINAC), Betatron, and so forth). In the medical field, the rugged semiconductor radiation detector may be used in neutron-based radiotherapy, which might involve a relatively small-sized sensor, and in compact-neutron-generator-based isotope-manufacturing systems. Moreover, the charge collection area of the rugged semiconductor radiation detector may allow for imaging capabilities (e.g., in a beam monitoring device).

Keeping in mind that the rugged semiconductor radiation detector of this disclosure may have a wide variety of suitable uses, the rugged semiconductor radiation detector will be discussed below in the context of a radiation-based downhole tool. It should be appreciated that, regardless of the particular application of the rugged semiconductor radiation detector, the rugged semiconductor radiation detector may be at least partially protected from potential hazards that may be more likely to occur in harsh (e.g., high-temperature and/or high-vibration) environments. Specifically, the rugged semiconductor radiation detector package may be hermetically sealed into a module (e.g., a single-chip module (SCM) or a multi-chip module (MCM) that included other circuitry, such as a preamplifier, processor, or power supply) that contains a gas dielectric material and/or a fluid or solid dielectric material. In addition, to reduce the likelihood of electrical arcing between components of the rugged semiconductor radiation detector under higher temperatures and/or vibrations, certain non-conductive buffer zones may be maintained between the edge of the semiconductor and metallization layers that cover surfaces of the semiconductor.

Figure 1:
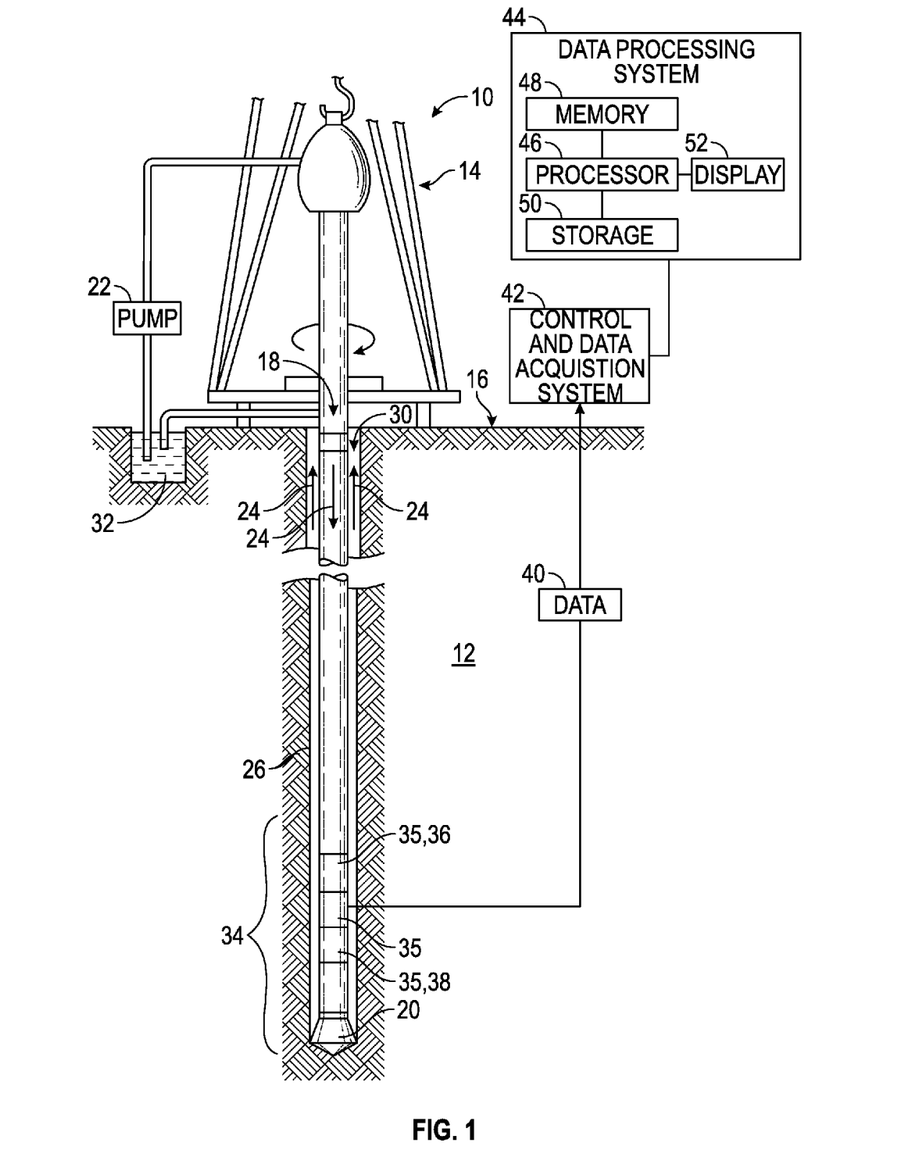
FIG. 1 is a schematic diagram of a drilling system that includes a rugged semiconductor radiation detector to survive harsh borehole environments, in accordance with an embodiment.

With this in mind, FIG. 1 illustrates a drilling system 10 that includes a radiation-based downhole tool employing such a rugged semiconductor radiation detector. The drilling system 10 may be used to drill a well into a geological formation 12 and obtain radiation-based logging measurements useful to identify characteristics of the well. In the drilling system 10, a drilling rig 14 at the surface 16 may rotate a drill string 18 having a drill bit 20 at its lower end. As the drill bit 20 is rotated, a drilling fluid pump 22 is used to pump drilling fluid 23, which may be referred to as "mud" or "drilling mud," downward through the center of the drill string 18 in the direction of the arrow to the drill bit 20. The drilling fluid 23, which is used to cool and lubricate the drill bit 20, exits the drill string 18 through the drill bit 20. The drilling fluid 23 then carries drill cuttings away from the bottom of a wellbore 26 as it flows back to the surface 16, as shown by the arrows through an annulus 30 between the drill string 18 and the formation 12. However, as described above, as the drilling fluid 23 flows through the annulus 30 between the drill string 18 and the formation 12, the drilling mud 23 may begin to invade and mix with the fluids stored in the formation, which may be referred to as formation fluid (e.g., natural gas or oil). At the surface 16, return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools 35. The downhole tools may collect a variety of information relating to the geological formation 12 and/or the state of drilling of the well. For instance, a measurement-while-drilling (MWD) tool 35, 36 may measure certain drilling parameters, such as the temperature, pressure, orientation of the drilling tool, and so forth. Likewise, a logging-whiledrilling (LWD) tool 35, 38 may measure the physical properties of the geological formation 12, such as density, porosity, resistivity, lithology, and so forth. The MWD tool 35, 36 and/or the LWD tool 35, 38 may include a downhole tool 35 that detects radiation (e.g., neutrons or photons) using a rugged semiconductor radiation detector as described further below.

The MWD tool 35, 36 and/or the LWD tool 35, 38 may collect a variety of data 40 that may be stored and processed in the BHA or, as illustrated in FIG. 1, may be sent to the surface for processing. In the example of this disclosure, the MWD tool 35, 36 and/or the LWD tool 35, 38 may include a radiation-based logging tool that detects radiation (e.g., neutrons, gamma-rays, x-rays, and so forth) using the rugged semiconductor radiation detector of this disclosure. The data 40 that is collected may include counts and/or detected energies of radiation that enter the downhole tool 35 from the formation 12, and thus may contain information relating to characteristics of the geological formation 12. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the drilling fluid 24. In another example, the data 40 may be retrieved directly from the MWD tool 35, 36 and/or the LWD tool 35, 38 upon return to the surface.

The data processing system 44 may include a processor 46, memory 48, storage 50, and/or a display 52. The data processing system 44 may use the data 40 to determine various properties of the well using any suitable techniques. As will be discussed further below, the MWD tool 35, 36 and/or LWD tool 35, 38 may obtain a good radiation detection signal despite a relatively smaller size in comparison to other radiation detectors that use plastic scintillators and photomultipliers. When the data processing system 44 processes the data 40, the determined well properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the MWD tool 35, 36 and/or the LWD tool 35, 38. It should be appreciated that, although the data processing system 44 is shown by way of example as being located at the surface, the data processing system 44 may be located in the MWD tool 35, 36 and/or the LWD tool 35, 38. In such embodiments, some of the data 40 may be processed and stored downhole, while some of the data 40 may be sent to the surface in real time. This may be the case particularly in LWD, where a limited amount of the data 40 may be transmitted to the surface during drilling or reaming operations.

Figure 2:
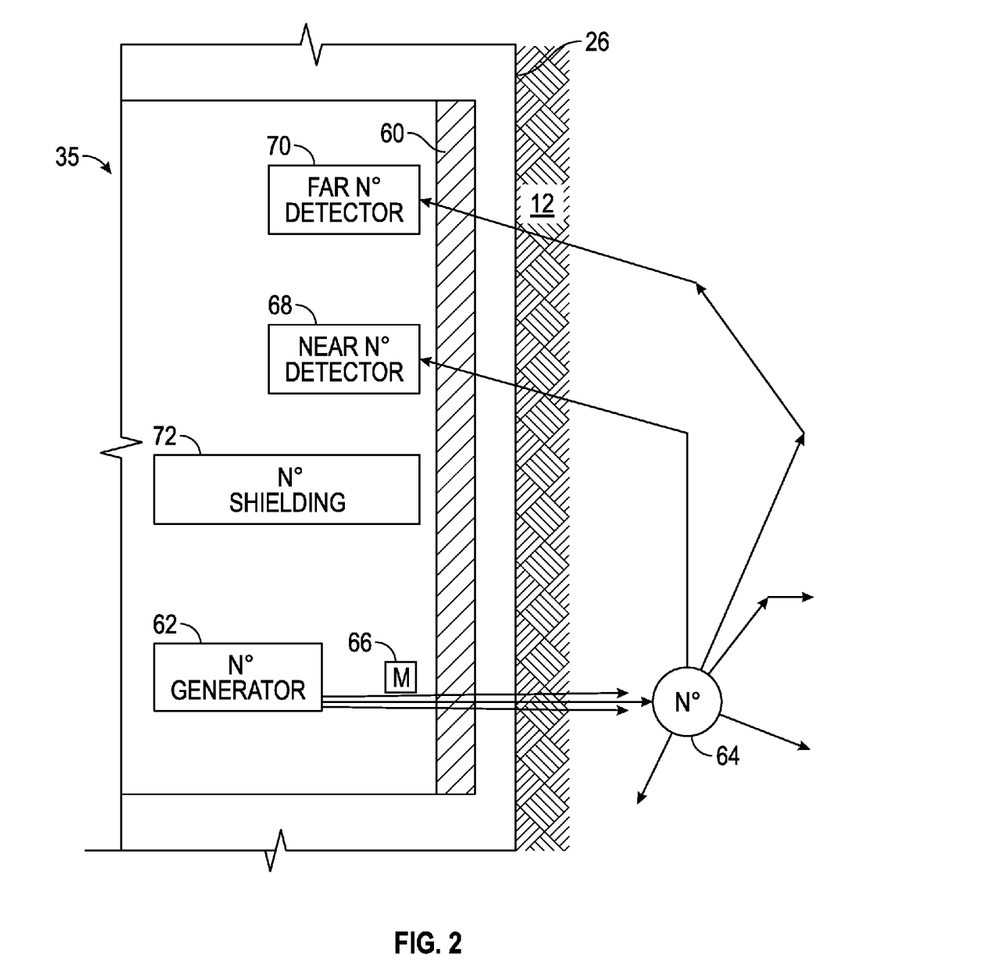
FIG. 2 is a schematic view of a downhole tool that includes the rugged semiconductor radiation detector, in accordance with an embodiment.

It should be noted that, although the downhole tool 35 of this disclosure is described by way of example in a logging-while-drilling (LWD) configuration, any other suitable means of conveyance may be employed (e.g., wireline, slickline, coiled tubing, and so forth). FIG. 2 provides a schematic illustration of one example of the downhole tool 35. A housing 60 contains, among other things, a nuclear or ionizing radiation source, such as a neutron generator 62. In the example of FIG. 2, the neutron generator 62 represents any suitable pulsed or continuous source of neutrons 64 (e.g., 14 MeV neutrons). By way of example, the neutron generator 62 may be a Minitron by Schlumberger Technology Corporation. In other embodiments, the downhole tool 35 may use any suitable radioisotopic source to produce radiation such as neutrons, gamma-rays, or x-rays. The radiation source may, additionally or alternatively, include other radiation sources (e.g., an electronic x-ray generator). The flux of neutrons 64 emitted by the neutron generator 62 may be measured by a neutron monitor 66. The neutron monitor 66 may measure the flux of neutrons 66 using the rugged semiconductor radiation detector of this disclosure.

The neutrons 64 that enter the geological formation 12 may scatter and be detected in varying quantities and energies by other radiation detectors, such as a near neutron detector 68 and a far neutron detector 70. The neutron detectors 68 and 70 may use the rugged semiconductor of this disclosure to detect the neutrons 64. The number and/or energy level of the neutrons 64 that reach the neutron detectors 68 and 70 may indicate the composition of the geological formation and/or the presence or absence of hydrocarbons. Neutron shielding 72 may prevent most of the neutrons 64 from passing through the downhole tool 35 into the neutron detectors 68 and 70. Because the rugged semiconductor radiation detectors of this disclosure may take up less space than other types of radiation detectors, the neutron monitor 66 and neutron detectors 68 and 70 may be smaller and/or more robust in harsh logging environment than other types of radiation detectors. This makes such a detector particularly suitable to be mounted in-line between the generator or source 62 and shielding 72 without a substantial reduction in the thickness of the shielding. Moreover, the schematic view of the downhole tool 35 shown in FIG. 2 is intended to be merely one example of a suitable downhole tool 35 that may use the rugged semiconductor radiation detectors. Indeed, the downhole tool 35 may include more or fewer neutron detectors formed from the rugged semiconductor radiation detectors of this disclosure. The downhole tool 35 may, additionally or alternatively, include radiation detectors that detect counts and/or spectra of photonic radiation, such as gamma-rays or x-rays.

Figure 3:
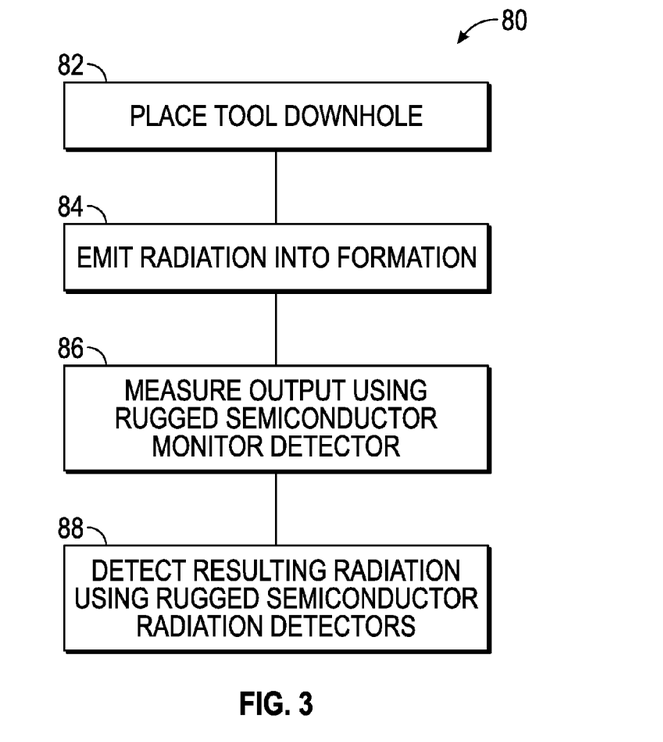
FIG. 3 is a flowchart of a method for using the downhole tool, in accordance with an embodiment.

The downhole tool 35 may be used to perform a well-logging operation as described by a flowchart 80 of FIG. 3. The downhole tool 35 may be placed into the wellbore 26 using any suitable means of conveyance (e.g., in a logging-while-drilling tool 35, 36 on the BHA 34 of the drill string 18) (block 82). The downhole tool 35 may emit radiation (e.g., neutrons 64) into the surrounding geological formation 12 (block 84). One or more rugged semiconductor radiation detectors (e.g., in the neutron monitor 66) may measure the flux of the radiation (e.g., the neutrons 64) being emitted from the downhole tool 35 (block 86). Radiation that results from interactions with the geological formation 12 (e.g., due to scattering of the neutrons 64) may be detected using one or more rugged semiconductor radiation detectors (e.g., in the neutron detectors 68 or 70) (block 84), thereby providing information that may be used to determine various characteristics of the geological formation.

Figure 4:
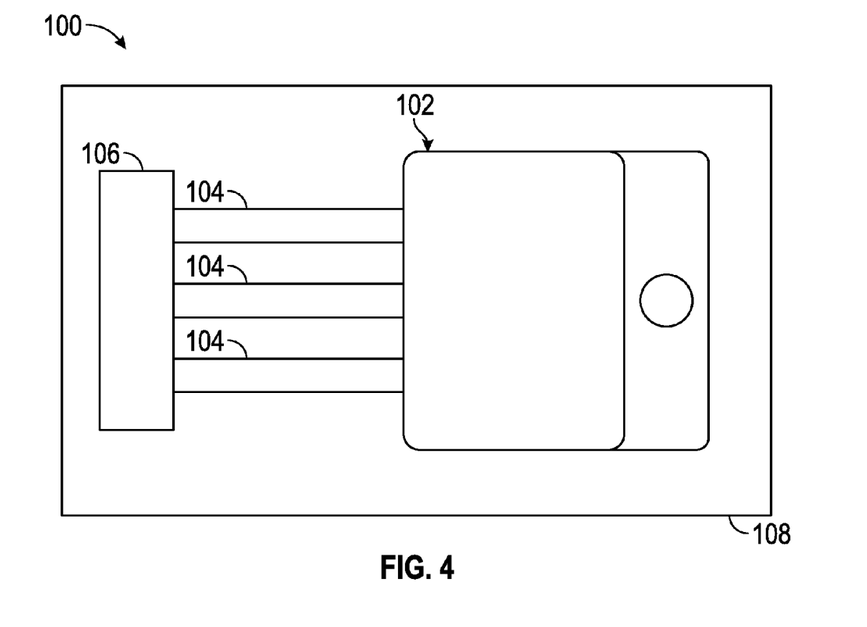
FIG. 4 is a schematic top view of the rugged semiconductor radiation detector disposed on a circuit board, in accordance with an embodiment.

FIG. 4 provides one example of a rugged semiconductor radiation detector 100. The rugged semiconductor radiation detector 100 includes a hermetically sealed detector module 102 (e.g., a single-chip module (SCM) or a multi-chip module (MCM) that included other circuitry, such as a preamplifier, processor, or power supply) having any suitable number of input/output pins 104. In one example, there are at least three input/output pins 104 that respectively couple to an anode, a cathode, and a body of the detector module 102. In general, the minimum number of input/output pins 104 may be two: one connected to the anode and one connected to the cathode to provide a voltage bias within the detector module 102. A package interface 106 communicably connects the input/output pins 104 to other circuitry on a circuit board 108. Other circuitry, including circuitry to support the detector module 102 (e.g., processor(s), signal amplifier(s), output interface(s), other and so forth), may be installed on the circuit board 108. The semiconductor detector 100 may have a sufficiently small footprint to be installed directly onto the neutron generator 62.

Figure 5:
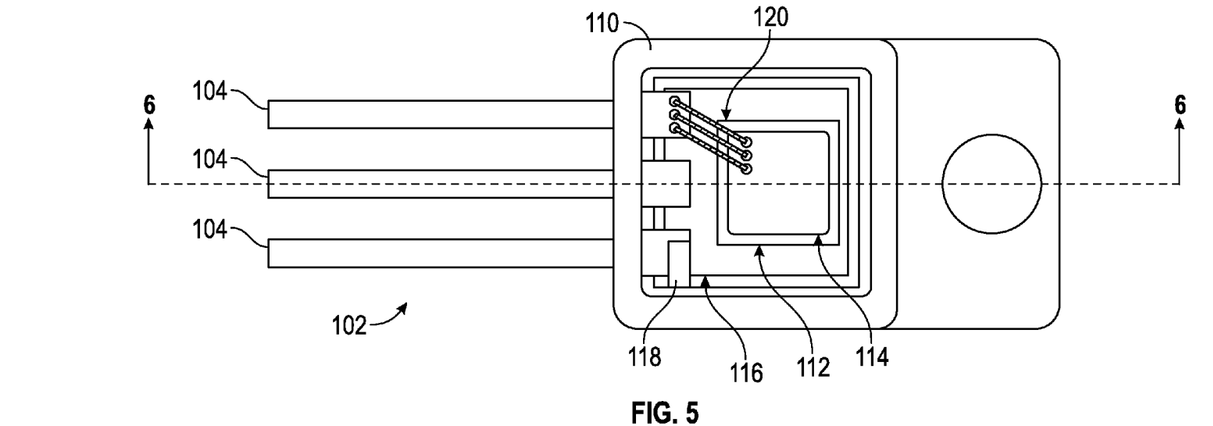
FIG. 5 is a top, cut-away view of the rugged semiconductor radiation detector showing internal components of the rugged semiconductor radiation detector, in accordance with an embodiment.
Figure 6:
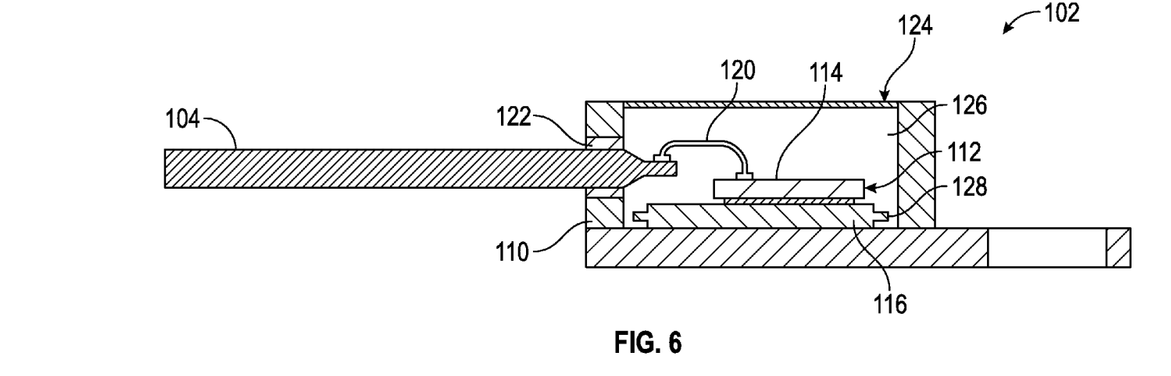
FIG. 6 is a cross-sectional side view of the rugged semiconductor radiation detector at cut lines 6-6 of FIG. 5, in accordance with an embodiment.

The detector module 102 may include a housing 110 that holds a semiconductor 112, as shown in FIGS. 5 and 6. FIG. 6 is a cross-sectional view of FIG. 5 at cut lines 6-6. The content of these figures will be discussed jointly. As seen in FIGS. 5 and 6, the semiconductor 112 has metallization layers 114 on opposite surfaces. A voltage differential between the metallization layer 114 on a top surface (e.g., a charge-collection side) and the metallization layer 114 on the lower surface (e.g., a voltage-supply side) may cause an electrical signal to result when radiation (e.g., a neutron, a gamma-ray, or an x-ray, and so forth) interacts with the semiconductor 112. The semiconductor 112 may be any suitable semiconductor material having a suitably high band gap to generate a response to radiation when a suitable voltage potential is applied. Thus, in some examples, the semiconductor 112 may include diamond, silicon carbide, and/or sapphire (e.g., a silicon-on-sapphire device). Depending on the application, the voltage potential between the metallization layers 114 may range from around 5V to several hundred volts during tests and operation. A supply electrode 118 coupled to one of the input/output pins 104 may provide one side of this voltage potential on the voltage-supply side of the metallization layer 114, and wire bonds 120 may supply the other voltage potential (e.g., ground) on the other, charge-collection side of the metallization layer 114. The wire bonds 120 may also serve to detect electrical variations on the charge-collection side of the metallization layer 114 occurring when radiation is detected on the semiconductor 112. In certain embodiments, the metallization layer 114 on the charge-collection side may be segmented and different wire bonds 120 may attach to different segments of the metallization layer 114, which may indicate a spatial position of the interaction with the radiation in the semiconductor 112. In a segmented configuration, each segment may be read out by a different electrical feed-through and/or a different wire bond 120 coupled to a different input/output pin 104.

As particularly shown in FIG. 6, a feed-through seal 122 and a top cover 124 may encapsulate a dielectric gas 126 in the detector module 102. The dielectric gas 126 may be a chemically inert gas that may be suitably dry and may have suitably good electrical insulation properties. These may include nitrogen, argon, sulfur hexafluoride, and/or air, provided that the dielectric gas 126 is suitably dry enough to be electrically insulative and not to cause excessive corrosion. In other embodiments, any suitable solid or fluid dielectric may take the place of, or complement, the dielectric gas 126. The semiconductor 112 may be connected, both electrically and structurally, to the electrode plate 116 via a support and adhesive layer 128. The support and adhesive layer 128 may include, for example, a metal (e.g., solder) and/or a conductive epoxy.

Figure 7:
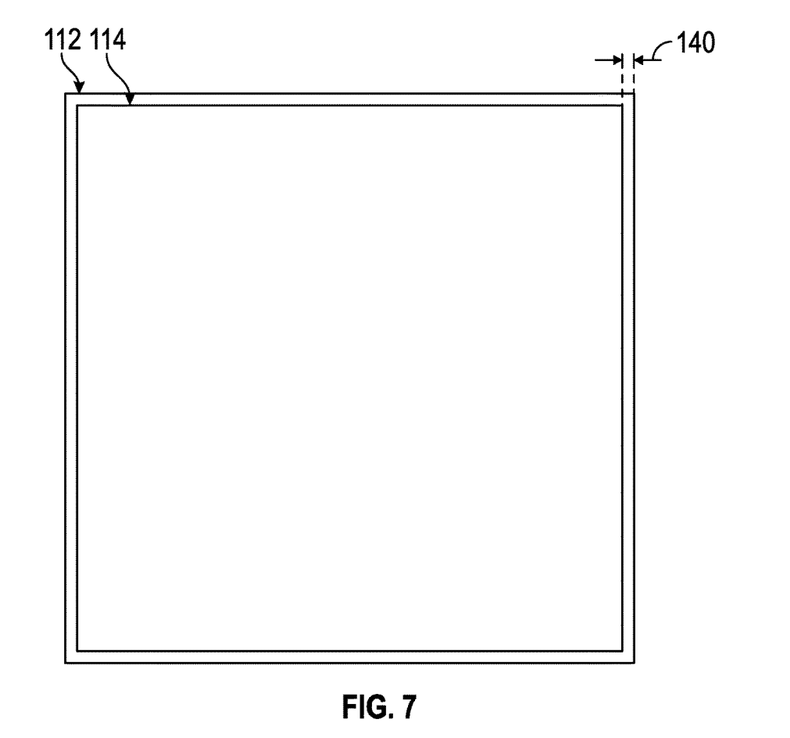
FIG. 7 is a top view of a semiconductor of the rugged semiconductor radiation detector, in accordance with an embodiment.
Figure 8:
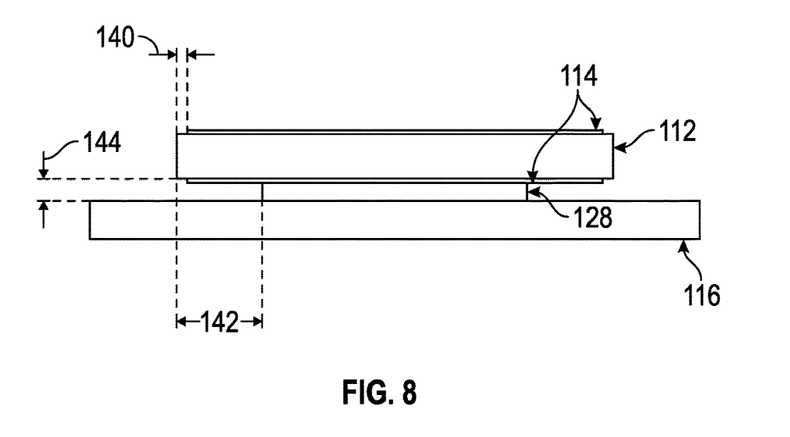
FIG. 8 is a side view of components of the rugged semiconductor radiation detector, in accordance with an embodiment.

The detector module 102 may survive harsh conditions such as high temperatures and high vibration without suffering electrical failure due to arcing, which may occur when an electrical triple point—a junction of a metal, a dielectric, and a vacuum—suffers sufficient electrical field stress to produce electron emission. One manner of preventing electrical failure is shown in FIGS. 7 and 8. As seen in these drawings, the metallization layers 114 on the semiconductor 112 may not extend all the way to the edge of the semiconductor 112. This leaves a nonconductive buffer zone 140 on the upper and/or lower surfaces of the semiconductor 112. The electrical field stress between the metallization layers 114 therefore may be substantially reduced compared to a semiconductor 112 having metallization layers 114 that did fully extend to the end of the semiconductor 112 surface. As a result, a likelihood of electrical arcing that might otherwise occur as temperatures increase may be reduced. In an example in which the semiconductor 112 is a diamond semiconductor of size 5 mm×5 mm×0.5 mm, the nonconductive buffer zone 140 may extend approximately 0.1 mm from the edge. As may be appreciated, the metallization may extend over the largest possible surface area to maximize charge collection, but may not go all the way to the face edge to minimize the intensity of the electric field, since high electric fields can be cause for electrical arcs and damage.

Any suitable nonconductive buffer zone 140 length, however, may be used, such that the likelihood of electrical failure is reduced under desired temperature and/or vibration conditions. Moreover, it should be understood that different nonconductive buffer zones 140 may be different on different edges and/or on different surfaces of the semiconductor 112. In one example, the nonconductive buffer zone 140 may be found only on one surface of the semiconductor 112. In another example, the nonconductive buffer zone 140 may have a different distance from the edge on one surface of the semiconductor 112 than on the other surface of the semiconductor 112. For example, the nonconductive buffer zone 140 may be greater on the upper surface of the semiconductor 112 and smaller on the lower surface (or even not substantially present on the lower surface).

Another manner of preventing electrical failure is to include a buffer zone 142 between the support and adhesive layer 128 and the edges of the semiconductor 112. As noted above, the support and adhesive layer 128 is conductive. By preventing the support and adhesive layer from extending all the way to the face edge of the semiconductor 112, the likelihood of arcing or other electrical failure may be reduced. In some examples, the buffer zone 142 may extend approximately 1 to 2 mm from the edge of the semiconductor 112.

A buffer zone 144 may also reduce the likelihood of electrical failure in the detector module 102. The buffer zone 144 may provide sufficient space with the dielectric gas 126 between the metallization layer 114 on the upper surface of the semiconductor 112 and the electrode plate 116. In one example, the buffer zone 144 may be approximately 0.1 mm.

The particular distances of the various buffer zones 140, 142, and/or 144 may vary depending on the expected temperature and/or vibrational conditions, bias voltages applied to the semiconductor 112, dielectric gas 126, and so forth. Moreover, more than one semiconductor 112 may be included in a single detector module 102. In some examples, several semiconductors 112 may be stacked on top of one another, employing suitable buffer zones consistent with those described in this disclosure.

Additionally, other electronic circuitry may be included in the detector module 102. For instance, it may be advantageous to locate a signal preamplifier very close to the sensor in order to improve the output signal and be less sensitive to noise. Additionally, if the detector module 102 is encased in a metallic envelope, the inside will be shielded from external electromagnetic signals, a great feature to provide good signals with low noise. Multi Chip Module (MCM) technology can be used to package the semiconductor and some electronics, such as a preamplifier, a high-voltage power supply, a processor, or any other suitable electronics. Additional feed through connections may be used for the addition of these other electronic components.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A semiconductor detector comprising:
a hermetically sealed housing;
a semiconductor disposed within the housing, the semiconductor having a first surface and a second surface, wherein the first surface is opposite the second surface;
a first metallization layer at least partially covering the first surface of the semiconductor; and
a second metallization layer at least partially covering the second surface of the semiconductor;
wherein the first metallization layer or the second metallization layer, or both, do not extend completely to an edge of the semiconductor, thereby providing a non-conductive buffer zone between the edge of the semiconductor and the first metallization layer or the second metallization layer, or both, and thereby reducing electrical field stresses that occur when a voltage potential is applied between the first metallization layer and the second metallization layer and thereby reducing a likelihood of electrical failure due to arcing.

2. The semiconductor detector of claim 1, comprising:
an electrode plate disposed within the housing and configured to receive a supply voltage; and
a conductive adhesive and support structure at least partially covering the second metallization layer and at least partially covering the electrode plate, wherein the conductive adhesive and support structure is configured to attach the second metallization layer to the electrode plate and provide the supply voltage to the second metallization layer, wherein the supply voltage and another voltage applied to the first metallization layer provide the voltage potential between the first metallization layer and the second metallization layer;
wherein:
the conductive adhesive and support structure does not extend completely to an edge of the second metallization layer, thereby providing a second nonconductive buffer zone between the edge of the second metallization layer and an edge of the conductive adhesive and support structure, thereby reducing electrical field stresses that occur when the voltage potential is applied between the first metallization layer and the second metallization layer via the conductive adhesive and support structure; or
the conductive adhesive and support structure provides a space between the electrode plate and the second metallization layer, thereby providing a third nonconductive buffer zone between at least part of the second metallization layer and the electrode plate, thereby reducing electrical field stresses that occur when the voltage potential is applied between the first metallization layer and the second metallization layer via the conductive adhesive and support structure; or
both.

3. The semiconductor detector of claim 2, wherein the conductive adhesive and support structure comprises a conductive epoxy, a metal solder, or a combination thereof.

4. The semiconductor detector of claim 2, wherein the supply voltage is provided by a voltage supply external to the hermetically sealed housing.

5. The semiconductor detector of claim 1, comprising a dielectric gas sealed within the housing.

6. The semiconductor detector of claim 5, wherein the dielectric gas comprises argon, nitrogen, or sulfur hexafluoride, or any combination thereof.

7. The semiconductor detector of claim 5, wherein the dielectric gas comprises dry air.

8. The semiconductor detector of claim 1, comprising a fluid dielectric material sealed within the housing.

9. The semiconductor detector of claim 1, wherein the semiconductor comprises diamond or silicon carbide, or both.

10. The semiconductor detector of claim 1, comprising a processor, pre-amplifier, power supply, or any combination thereof, contained within the hermetically sealed housing.

11. A method for logging a well comprising:
placing a downhole tool in a wellbore in a geological formation;
emitting radiation from the downhole tool into the geological formation; and
detecting radiation emitted from the downhole tool using a rugged semiconductor radiation detector, wherein the rugged semiconductor radiation detector comprises:
a semiconductor disposed within a hermetically sealed housing, the semiconductor having a first surface and a second surface, wherein the first surface is opposite the second surface, and wherein the first surface has a first metallization layer at least partially covering the first surface and the second surface has a second metallization layer at least partially covering the second surface;
an electrode plate disposed within the housing and configured to receive a supply voltage; and
a conductive adhesive and support structure at least partially covering the second metallization layer and at least partially covering the electrode plate, wherein the conductive adhesive and support structure is configured to attach the second metallization layer to the electrode plate and provide the supply voltage to the second metallization layer, wherein the supply voltage and another voltage applied to the first metallization layer provide a voltage potential between the first metallization layer and the second metallization layer;
wherein:
the conductive adhesive and support structure does not extend completely to an edge of the second metallization layer, thereby providing a first nonconductive buffer zone between the edge of the second metallization layer and an edge of the conductive adhesive and support structure, thereby reducing electrical field stresses that occur when the voltage potential is applied between the first metallization layer and the second metallization layer via the conductive adhesive and support structure; or the conductive adhesive and support structure provides a space between the second metallization layer and the electrode plate, thereby providing a second nonconductive buffer zone between at least part of the second metallization layer and the electrode plate, thereby reducing electrical field stresses that occur when the voltage potential is applied between the first metallization layer and the second metallization layer via the conductive adhesive and support structure; or
both.

12. The method of claim 11, wherein placing the downhole tool in the wellbore comprises drilling the wellbore using a borehole assembly (BHA) that contains the downhole tool.

13. The method of claim 11, wherein placing the downhole tool in the wellbore comprises placing the downhole tool in the wellbore after the wellbore has been drilled.

14. The method of claim 13, wherein the downhole tool is placed into the wellbore using a wireline conveyance, coiled tubing conveyance, slickline conveyance, or any combination thereof.

15. The method of claim 11, wherein the first metallization layer or the second metallization layer, or both, do not extend completely to an edge of the semiconductor, thereby providing a third nonconductive buffer zone between the edge of the semiconductor and the first metallization layer or the second metallization layer, or both, and thereby reducing electrical field stresses that occur when the voltage potential is applied between the first metallization layer and the second metallization layer.

16. A downhole device comprising:
a radiation source configured to emit ionizing radiation or nuclear radiation, or both, into a geological formation;
one or more radiation detectors configured to detect the emitted radiation or radiation that results after interactions between the emitted radiation and the geological formation, wherein the one or more radiation detectors comprise a rugged semiconductor radiation detector, wherein the rugged semiconductor radiation detector comprises:
a semiconductor disposed within a hermetically sealed housing, the semiconductor having a first surface and a second surface, wherein the first surface is opposite the second surface, and wherein the first surface has a first metallization layer at least partially covering the first surface and the second surface has a second metallization layer at least partially covering the second surface, wherein the first metallization layer or the second metallization layer, or both, do not extend completely to an edge of the semiconductor, thereby providing a nonconductive buffer zone between the edge of the semiconductor and the first metallization layer or the second metallization layer, or both, and thereby reducing electrical field stresses that occur when a voltage potential is applied between the first metallization layer and the second metallization layer.

17. The downhole device of claim 16, wherein the radiation source comprises an electronic neutron generator and the one or more radiation detectors comprise a neutron monitor that comprises the rugged semiconductor radiation detector.

18. The downhole device of claim 17, wherein the neutron monitor comprises an integral component of the electronic neutron generator, wherein the rugged semiconductor radiation detector is disposed on a circuit board of the electronic neutron generator.

19. The downhole device of claim 16, wherein the downhole device is configured to be used in a conveyance of wireline, slickline, coiled tubing, or a combination thereof.

20. The downhole device of claim 16, wherein the rugged semiconductor device comprises:
an electrode plate disposed within the housing and configured to receive a supply voltage; and
a conductive adhesive and support structure at least partially covering the second metallization layer and at least partially covering the electrode plate, wherein the conductive adhesive and support structure is configured to attach the second metallization layer to the electrode plate and provide the supply voltage to the second metallization layer, wherein the supply voltage and another voltage applied to the first metallization layer provide a voltage potential between the first metallization layer and the second metallization layer;
wherein:
the conductive adhesive and support structure does not extend completely to an edge of the second metallization layer, thereby providing a second nonconductive buffer zone between the edge of the second metallization layer and an edge of the conductive adhesive and support structure, thereby reducing electrical field stresses that occur when the voltage potential is applied between the first metallization layer and the second metallization layer via the conductive adhesive and support structure; or
the conductive adhesive and support structure provides a space between the second metallization layer, thereby providing a third nonconductive buffer zone between at least part of the second metallization layer and the electrode plate, thereby reducing electrical field stresses that occur when the voltage potential is applied between the first metallization layer and the second metallization layer via the conductive adhesive and support structure; or
both.

* * * * *